(12) United States Patent
Friedmann

(10) Patent No.: US 10,029,554 B2
(45) Date of Patent: Jul. 24, 2018

(54) AXLE HYBRID DRIVE

(71) Applicant: Schaeffler Technologies GmbH & Co. KG, Herzogenaurach (DE)

(72) Inventor: Oswald Friedmann, Lichtenau (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 53 days.

(21) Appl. No.: 14/382,121

(22) PCT Filed: Feb. 13, 2013

(86) PCT No.: PCT/EP2013/052853
§ 371 (c)(1),
(2) Date: Aug. 29, 2014

(87) PCT Pub. No.: WO2013/131724
PCT Pub. Date: Sep. 12, 2013

(65) Prior Publication Data
US 2015/0328972 A1 Nov. 19, 2015

(30) Foreign Application Priority Data
Mar. 9, 2012 (DE) .......... 10 2012 203 718

(51) Int. Cl.
*B60K 6/52* (2007.10)
*B60K 6/383* (2007.10)
(Continued)

(52) U.S. Cl.
CPC .......... *B60K 6/383* (2013.01); *B60K 6/48* (2013.01); *B60K 6/52* (2013.01);
(Continued)

(58) Field of Classification Search
CPC . B60K 6/383; B60K 6/48; B60K 6/52; B60K 6/20; Y10S 903/902
(Continued)

(56) References Cited

U.S. PATENT DOCUMENTS 6,041,877 A * 3/2000 Yamada .................. B60K 6/40
180/242
6,059,064 A * 5/2000 Nagano .................. B60K 6/44
180/243
(Continued)

FOREIGN PATENT DOCUMENTS

CN 1681676 A 10/2005
CN 2846202 Y 12/2006
(Continued)

OTHER PUBLICATIONS

Office Action in Chinese Patent Application No. 201380013299.8 dated Feb. 22, 2016, 9 pages.

*Primary Examiner* — Tony H Winner
*Assistant Examiner* — Michael R Stabley
(74) *Attorney, Agent, or Firm* — Volpe and Koenig, P.C.

(57) ABSTRACT

An axle hybrid drive for a hybrid vehicle (1), including an internal combustion engine (6) drivingly connected to a first vehicle axle (11), and an electric motor (10) drivingly connected to a second vehicle axle (12). The invention is characterized in that the internal combustion engine (6), or a transmission (7) associated with the internal combustion engine (6), is decoupled in terms of a driving force from an output shaft of the first vehicle axle (11).

8 Claims, 2 Drawing Sheets

(51) Int. Cl.
*B60K 6/48* (2007.10)
*B60W 30/18* (2012.01)

(52) U.S. Cl.
CPC .. *B60W 2030/1809* (2013.01); *Y02T 10/6221* (2013.01); *Y02T 10/6265* (2013.01); *Y10S 903/902* (2013.01)

(58) Field of Classification Search
USPC ........................................................ 180/243
See application file for complete search history.

(56) References Cited

U.S. PATENT DOCUMENTS

| | | | |
|---|---|---|---|
| 6,244,403 B1 | 6/2001 | Ito et al. | |
| 6,616,567 B2* | 9/2003 | Strong | F16H 3/66 |
| | | | 475/322 |
| 6,638,195 B2* | 10/2003 | Williams | B60K 6/38 |
| | | | 180/243 |
| 6,685,591 B2* | 2/2004 | Hanyu | B60K 6/36 |
| | | | 180/65.225 |
| 6,770,005 B2* | 8/2004 | Aikawa | B60K 1/00 |
| | | | 475/231 |
| 6,857,985 B2* | 2/2005 | Williams | B60K 6/38 |
| | | | 180/65.25 |
| 7,147,071 B2* | 12/2006 | Gering | B60H 1/00278 |
| | | | 165/164 |
| 7,490,685 B2 | 2/2009 | Aoki et al. | |
| 7,559,390 B2* | 7/2009 | Marsh | B60K 6/26 |
| | | | 180/55 |
| 7,806,796 B2* | 10/2010 | Zhu | B60K 6/48 |
| | | | 475/73 |
| 8,240,286 B2* | 8/2012 | Li | B60K 6/383 |
| | | | 123/179.25 |
| 8,340,880 B2* | 12/2012 | Craig | B60K 17/3515 |
| | | | 180/246 |
| 8,738,207 B2* | 5/2014 | Holmes | B60K 6/24 |
| | | | 180/65.265 |
| 9,168,825 B2 | 10/2015 | Ortmann et al. | |
| 2002/0134634 A1 | 9/2002 | Ito et al. | |
| 2009/0015023 A1 | 1/2009 | Fleckner | |
| 2009/0062999 A1* | 3/2009 | Craig | B60K 17/3515 |
| | | | 701/69 |
| 2011/0168118 A1* | 7/2011 | Li | B60K 6/383 |
| | | | 123/179.25 |
| 2012/0022731 A1 | 1/2012 | Kuang et al. | |

FOREIGN PATENT DOCUMENTS

| | | |
|---|---|---|
| CN | 101607523 A | 12/2009 |
| CN | 101885300 A | 11/2010 |
| CN | 102343802 A | 2/2012 |
| DE | 19933242 | 1/2000 |
| DE | 102007032726 | 1/2009 |
| DE | 102008041693 | 3/2010 |
| DE | 102008042132 | 3/2010 |
| DE | 102009002438 | 10/2010 |
| EP | 0224144 | 6/1987 |
| EP | 1382475 | 1/2004 |
| EP | 1433641 | 6/2004 |

* cited by examiner

AXLE HYBRID DRIVE

BACKGROUND

The invention relates to an axle hybrid drive for a hybrid vehicle with an internal combustion engine, drivingly connected to a first vehicle axle, and with an electric motor, drivingly connected to a second vehicle axle.

Various embodiments of axle hybrid drives are known from the German publications DE 10 2008 041 693 A1, DE 10 2009 002 438 A1, and DE 10 2008 042 132 A1, which are also called shaft hybrid drives. In axle hybrid drives of prior art the internal combustion engine is drivingly connected to a first vehicle axle. An electric motor is drivingly connected to a second vehicle axle.

SUMMARY

The objective of the invention is to reduce undesired loss during the operation of the axle hybrid drive.

The objective is attained in an axle hybrid drive for a hybrid vehicle with an internal combustion engine, drivingly connected to a first vehicle axle, and with an electric motor, drivingly connected to a second vehicle axle, such that the internal combustion engine and/or a transmission allocated to the internal combustion engine is decoupled in terms of thrust from the output shaft of the first vehicle axle. In axle hybrid drives of prior art, in a purely electromotive drive, a transmission allocated to the internal combustion engine is driven by the street. Here, dragging loss develops, which can amount up to approximately ten percent of the electric drive performance. According to the invention, by decoupling the internal combustion engine and/or the transmission allocated to the internal combustion engine from the output shaft of the first vehicle axle this dragging loss can be reduced in a simple fashion.

A preferred exemplary embodiment of the axle hybrid drive is characterized in that the internal combustion engine and/or the transmission is decoupled in terms of thrust from the output shaft of the first vehicle axle by a freewheel arrangement. The first vehicle axle can be driven by the internal combustion engine by the freewheel arrangement. For this purpose the freewheel arrangement has a locking direction, in which it provides a rotationally fixed connection for transmitting torque between the internal combustion engine and/or the transmission and the output shaft of the first vehicle axle. The freewheel arrangement further comprises a freewheel direction, in which no torque is transmitted from the output shaft of the first vehicle axle to the internal combustion engine and/or the transmission. A reverse drive is provided in the axle hybrid drive according to the invention exclusively by the electric motor.

Another preferred exemplary embodiment of the axle hybrid drive is characterized in that the freewheel arrangement of the internal combustion engine and/or the transmission are switched downstream at the side of the output shaft. The term downstream relates to a torque provided by the internal combustion engine, which is transmitted via the transmission to the driven wheels of the first vehicle axle. Here the vehicle wheels represent the driven side or the output shaft of the internal combustion engine. The internal combustion engine is preferably allocated to a front axle of the hybrid vehicle. The electric motor is preferably allocated to a rear axle of the hybrid vehicle.

Another preferred exemplary embodiment of the axle hybrid drive is characterized in that the freewheel arrangement locks when a driving speed exceeds the driven speed of the first vehicle axle. The driving speed is provided by the internal combustion engine and altered by the transmission, if necessary. The driven speed is the speed by which the vehicle wheels rotate. The freewheel arrangement locks during a driving action of the first vehicle axle by the internal combustion engine. The freewheel arrangement opens when the drive occurs exclusively by the electric motor via the second vehicle axle. Then the internal combustion engine is stationary and the output speed of the first vehicle axle is greater than its driving speed.

Another preferred exemplary embodiment of the axle hybrid drive is characterized in that the freewheel arrangement comprises a freewheel, which is switched between the internal combustion engine and/or the transmission and the output shaft of the first vehicle axle. The freewheel can be embodied as a clamp roll, clamp body, or a ratchet freewheel.

Another preferred exemplary embodiment of the axle hybrid drive is characterized in that the freewheel is arranged between an end of a cardan shaft and a wheel bearing of a vehicle wheel of the first vehicle axle. The freewheel may advantageously be combined with a wheel bearing. Preferably, a freewheel is allocated to each driven wheel of the first vehicle axis.

Another preferred exemplary embodiment of the axle hybrid drive is characterized in that the freewheel is integrated in the vehicle wheel. This is advantageous in that no other alterations need to be performed at the vehicle with the axle hybrid drive according to the invention.

Another preferred exemplary embodiment of the axle hybrid drive is characterized in that the electric motor is directly connected to the second vehicle axle. Here directly indicates that no transmission is interposed. The second vehicle axle can be driven forwards and backwards via the electric motor.

Another preferred exemplary embodiment of the axle hybrid drive is characterized in that an electric heating device is allocated to a cooling device of the internal combustion engine, which is connected to an electric energy storage unit allocated to the electric motor. The electric storage unit preferably represents a battery, particularly a high-voltage battery. The cooling device preferably represents a conventional radiator. The electric heating device may be embodied as an immersion heater, which converts electric energy generated by the electric energy storage unit into thermal energy, which is released to the cooling device. Here the heat is preferably released to a cooling medium, such as cooling water, by which the cooling device is operated. By the electric heating device advantageously excess electric brake energy can be dissipated when the electric energy storage unit is fully charged.

Furthermore, the invention relates to a hybrid vehicle with such an above-described axle hybrid drive.

The invention further relates, if applicable, to a separately marketable freewheel for an axle hybrid drive described above.

BRIEF DESCRIPTION OF THE DRAWINGS

Additional advantages, features, and details of the invention are discernible from the following description, in which various exemplary embodiments are described in greater detail with reference to the drawing. Shown are.

DETAILED DESCRIPTION OF THE PREFERRED EMBODIMENTS

Figure 1:
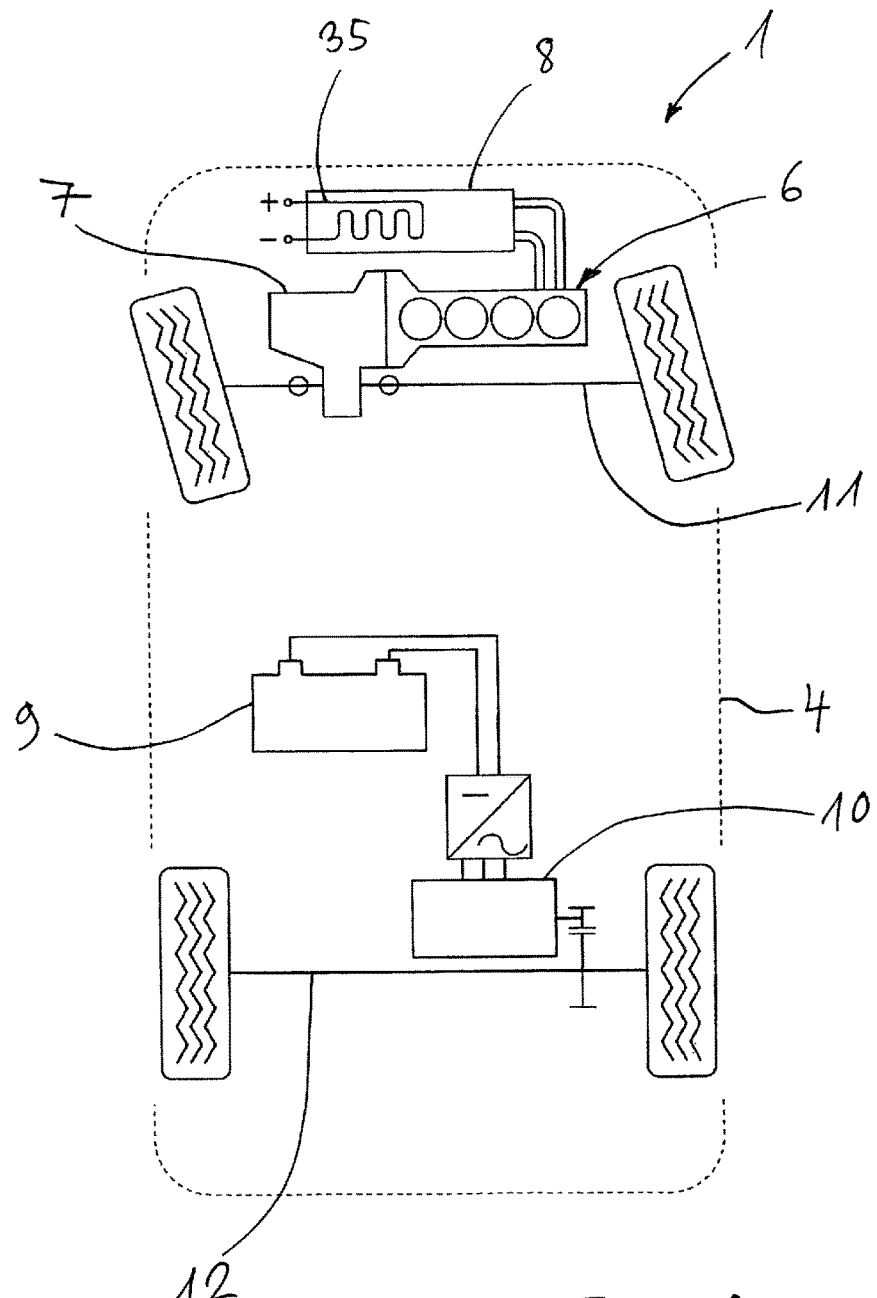
FIG. 1 a perspective view of a hybrid vehicle with an axle hybrid drive according to the invention, and FIG. 2 a front wheel of the hybrid vehicle of FIG. 1 in a cross-section.

FIG. 1 shows a hybrid vehicle 1 with an axle hybrid drive 4 in a simplified illustration. The axle hybrid drive 4 comprises an internal combustion engine 6, with a transmission 7 and a cooling device 8 being allocated thereto.

The hybrid vehicle 1 further comprises an electric storage unit 9 embodied as a high-voltage battery. An electric motor 10 is connected to the battery 9. The electric motor 10 is drivingly connected to a rear axle 12 of the hybrid vehicle 1.

A front axle 11 of the hybrid vehicle 1 is drivingly connected via the transmission 7 to the internal combustion engine 6. The front axle 11 is also called the first vehicle axle. Similarly, the rear axle 12 is also called the second vehicle axle.

Figure 2:
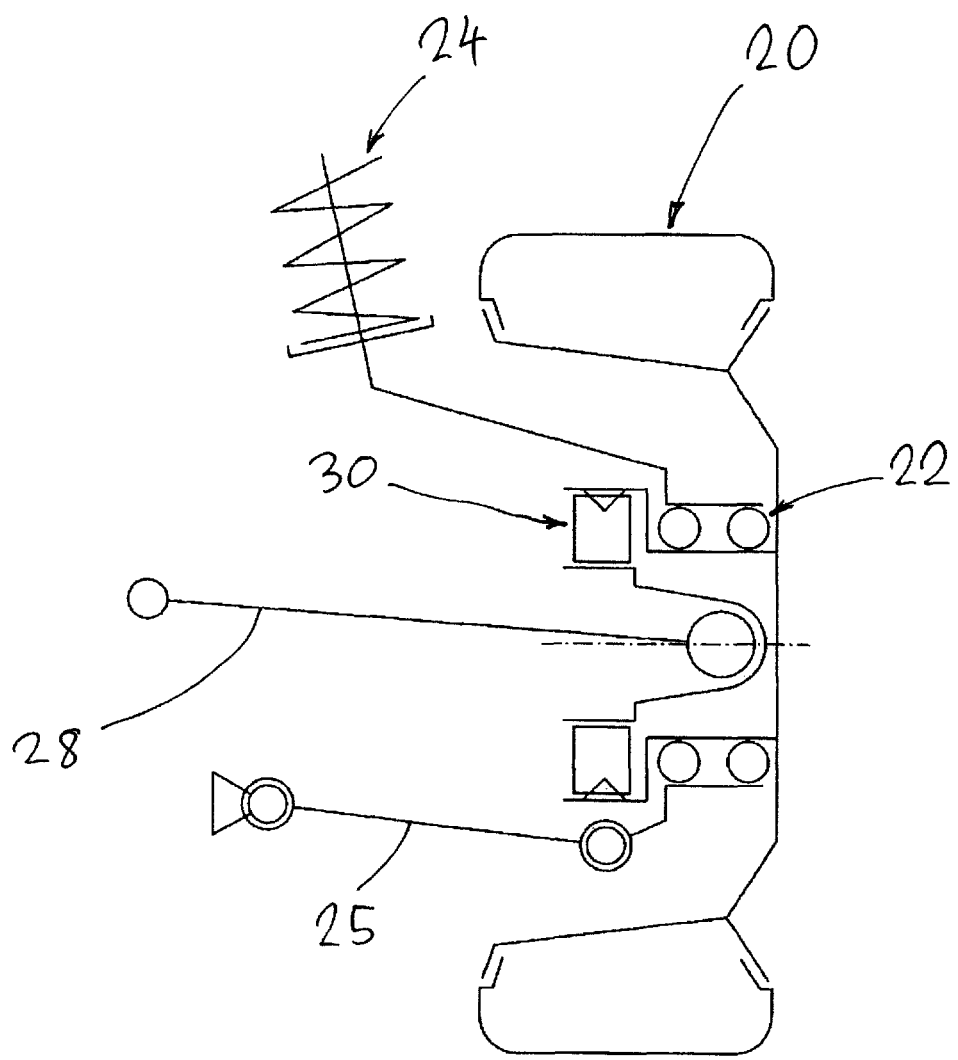

FIG. 2 shows a front wheel 20 in a cross-section. The front wheel 20 represents one of the two front wheels of the front axle 11 of the hybrid vehicle 1 marked 11 in FIG. 1. The front wheel 20 is connected via a wheel bearing 22, a spring 24, and a control arm 25 to a support structure of the hybrid vehicle. Via the wheel bearing 22 the front wheel 20 is rotational in reference to the support structure.

The front wheel 20 can be drivingly connected via the cardan shaft 28 to the transmission 7 of the internal combustion engine 6 in the figure. The end of the cardan shaft 28 can be drivingly connected to the front wheel 20, with a freewheel arrangement 30 being interposed. A driving torque can be transmitted from the cardan shaft 28 via the freewheel arrangement 30 to the front wheel 20. Here, the freewheel arrangement 30 locks in a locking direction.

In a freewheel direction, no torque is transmitted via the freewheel arrangement. This way, the front wheel 20 is decoupled in terms of thrust from the cardan shaft 28. The internal combustion engine 6 is coupled via the freewheel arrangement 30 to the output shaft, i.e. the front wheels, of the front axle 11. Here, the internal combustion engine 6 is decoupled in terms of thrust via the freewheel arrangement 30 from the output shaft.

The required thrust momentum is provided by the electric motor 10, which is directly coupled to the rear axle 12. The electric motor 10 also ensures exclusively the drive of the hybrid vehicle 1 in the reverse gear. Here, the transmission 7 is in a neutral position.

It is discernible in FIG. 1 that the cooling device 8 is equipped with an electric heating device 35. The electric heating device 35 operates like an immersion heater, by which heat can be dissipated to a cooling medium, such as cooling water, of the cooling device 8. The heating device 35 is electrically connected to the electric energy storage unit 9.

When a hybrid vehicle 1 drives downhill with a fully charged battery 9, here brake momentum and thus electric energy is generated, this excess energy can be dissipated via the heating device 35 into the cooling medium of the cooling device 8. This leads to an additional charging of the cooling device 8, because at this time the internal combustion engine 6 is stationary.

LIST OF REFERENCE CHARACTERS

1 Hybrid vehicle
4 Axle hybrid drive
6 Internal combustion engine
7 Transmission
8 Cooling device
9 Battery
10 Electric motor
11 First vehicle axle
12 Second vehicle axle
20 Front wheel
22 Wheel bearing
24 Spring
25 Control arm
28 Cardan shaft
30 Freewheel arrangement
35 Heating device

The invention claimed is:

1. An axle hybrid drive for a hybrid vehicle comprising an internal combustion engine, drivingly connected to a first vehicle axle, and an electric motor, drivingly connected to a second vehicle axle, wherein the first vehicle axle includes a wheel, and wherein at least one of the internal combustion engine or a transmission allocated to the internal combustion engine are decoupled in terms of a driving force from the wheel and coupled in terms of a driving force to the wheel, wherein the decoupling occurs at the wheel,
further comprising a freewheel arrangement, the at least one of the internal combustion engine or the transmission are decoupled via the freewheel arrangement from the wheel of the first vehicle axle, and
the freewheel arrangement includes a freewheel arranged between an end of a cardan shaft and a wheel bearing of the wheel of the first vehicle axle.

2. The axle hybrid drive according to claim 1, wherein the freewheel arrangement of the at least one of the internal combustion engine or the transmission is arranged downstream at a side of the wheel.

3. The axle hybrid drive according to claim 1, wherein the freewheel is embodied as a clamp roll, clamp body, or ratchet freewheel.

4. The axle hybrid drive according to claim 1, wherein the electric motor is directly connected to the second vehicle axle.

5. An axle hybrid drive for a hybrid vehicle comprising an internal combustion engine, drivingly connected to a first vehicle axle, and an electric motor, drivingly connected to a second vehicle axle, wherein the first vehicle axle includes a wheel, and wherein at least one of the internal combustion engine or a transmission allocated to the internal combustion engine are decoupled in terms of a driving force from the wheel and coupled in terms of a driving force to the wheel, wherein the decoupling occurs at the wheel,
further comprising a freewheel arrangement, the at least one of the internal combustion engine or the transmission are decoupled via the freewheel arrangement from the wheel of the first vehicle axle,
wherein the freewheel arrangement locks when a driving speed is greater than a driven speed of the first vehicle axle.

6. The axle hybrid drive according to claim 5, wherein the freewheel arrangement includes a freewheel arranged between an end of a cardan shaft and a wheel bearing of the wheel of the first vehicle axle.

7. The axle hybrid drive according to claim 5, wherein the freewheel arrangement includes a freewheel integrated in the vehicle wheel.

8. An axle hybrid drive for a hybrid vehicle comprising an internal combustion engine, drivingly connected to a first vehicle axle, and an electric motor, drivingly connected to a second vehicle axle, wherein the first vehicle axle includes a wheel, at least one of the internal combustion engine or a transmission allocated to the internal combustion engine are decoupled in terms of a driving force from the wheel, and wherein an electric heating device is allocated to a cooling device of the internal combustion engine, which is connected to an electric energy storage unit allocated to the electric motor.

\* \* \* \* \*